US009635222B2

(12) United States Patent
Blum

(10) Patent No.: US 9,635,222 B2
(45) Date of Patent: Apr. 25, 2017

(54) WEARABLE CAMERA SYSTEMS AND APPARATUS FOR ALIGNING AN EYEWEAR CAMERA

(71) Applicant: PogoTec, Inc., Roanoke, VA (US)

(72) Inventor: Ronald D. Blum, Roanoke, VA (US)

(73) Assignee: PogoTec, Inc., Roanoke, VA (US)

( * ) Notice: Subject to any disclaimer, the term of this patent is extended or adjusted under 35 U.S.C. 154(b) by 0 days.

(21) Appl. No.: 14/832,723

(22) Filed: Aug. 21, 2015

(65) Prior Publication Data

US 2016/0037025 A1 Feb. 4, 2016

Related U.S. Application Data

(63) Continuation-in-part of application No. 14/816,995, filed on Aug. 3, 2015.

(60) Provisional application No. 62/039,997, filed on Aug. 21, 2014, provisional application No. 62/045,246, filed on Sep. 3, 2014, provisional application No. 62/032,589, filed on Aug. 3, 2014, provisional application No. 62/045,246, filed on Sep. 3, 2014, provisional application No. 62/086,747, filed on Dec. 3, 2014, provisional application No. 62/091,697, filed on Dec. 15, 2014, provisional application No.
(Continued)

(51) Int. Cl.
*H04N 5/225* (2006.01)
*H04N 5/232* (2006.01)
*H04N 5/335* (2011.01)
*G06F 1/16* (2006.01)

(52) U.S. Cl.
CPC ......... *H04N 5/2251* (2013.01); *G06F 1/1686* (2013.01); *H04N 5/2257* (2013.01); *H04N 5/23293* (2013.01); *H04N 5/335* (2013.01)

(58) Field of Classification Search
CPC . H04N 5/2251; H04N 5/2257; H04N 5/23293
See application file for complete search history.

(56) References Cited

U.S. PATENT DOCUMENTS 3,476,467 A 11/1969 Curry
3,593,449 A 7/1971 Nielson
(Continued)

FOREIGN PATENT DOCUMENTS

CN 201318005 9/2009
CN 202033546 U 11/2011
(Continued)

OTHER PUBLICATIONS

"Inductive Limits in the Frequency Range 9 kHz to 148.5 kHz", ECC Reports 135, Electronic Communications Committee (ECC) with the European Conference of Postal and Telecommunications (CEPT); Bordeaux, Sep. 2009, pp. 1-16.
(Continued)

*Primary Examiner* — Abdelaaziz Tissire
(74) *Attorney, Agent, or Firm* — Dorsey & Whitney LLP

(57) ABSTRACT

A wearable camera system includes an eyewear which includes a temple and a lens and a camera coupled to eyewear, the camera having a field of view. The wearable camera system further includes a marker coupled to the eyewear, the camera, or both, the marker positionable on or in front of the lens of the eyewear at a location such that when a wearer of the eyewear aligns the marker with a target, the field of view of the camera includes the target.

16 Claims, 10 Drawing Sheets

Related U.S. Application Data

62/153,999, filed on Apr. 28, 2015, provisional application No. 62/048,820, filed on Sep. 11, 2014, provisional application No. 62/052,910, filed on Sep. 19, 2014, provisional application No. 62/053,275, filed on Sep. 22, 2014, provisional application No. 62/140,276, filed on Mar. 30, 2015, provisional application No. 62/154,007, filed on Apr. 28, 2015, provisional application No. 62/080,437, filed on Nov. 17, 2014.

(56) References Cited

U.S. PATENT DOCUMENTS

| | | |
|---|---|---|
| 3,780,918 A | 12/1973 | Curtis |
| 4,379,988 A | 4/1983 | Mattatall |
| 4,405,213 A | 9/1983 | Kolkmann |
| 4,457,461 A | 7/1984 | Docking et al. |
| 4,506,961 A | 3/1985 | Palmieri |
| 4,516,157 A | 5/1985 | Campbell |
| 4,781,315 A | 11/1988 | Nordskog |
| 4,816,031 A | 3/1989 | Pfoff |
| 4,845,755 A | 7/1989 | Busch et al. |
| 4,918,737 A | 4/1990 | Luethi |
| 5,181,051 A | 1/1993 | Townsend et al. |
| 5,416,537 A | 5/1995 | Sadler |
| 5,568,207 A | 10/1996 | Chao |
| 5,606,743 A | 2/1997 | Vogt et al. |
| 5,608,808 A | 3/1997 | Da Silva |
| 5,623,703 A * | 4/1997 | Takagi ............ G02B 7/287 396/51 |
| 5,636,775 A | 6/1997 | Kartsotis et al. |
| 5,786,789 A | 7/1998 | Janky |
| 5,913,815 A | 6/1999 | Ball et al. |
| 5,915,588 A | 6/1999 | Stoken et al. |
| 6,028,413 A | 2/2000 | Brockmann |
| 6,076,927 A | 6/2000 | Owens |
| 6,091,546 A | 7/2000 | Spitzer |
| 6,157,291 A | 12/2000 | Kuenster et al. |
| 6,215,460 B1 * | 4/2001 | Mizoguchi ....... G02B 27/0172 345/7 |
| 6,275,681 B1 | 8/2001 | Vega et al. |
| 6,735,897 B1 | 5/2004 | Schmitter |
| 6,783,238 B1 | 8/2004 | Stepper |
| 6,977,479 B2 | 12/2005 | Hsu |
| 7,003,353 B1 | 2/2006 | Parkhouse |
| 7,092,763 B1 | 8/2006 | Griffith et al. |
| 7,126,558 B1 | 10/2006 | Dempski |
| 7,158,096 B1 | 1/2007 | Spitzer |
| 7,203,134 B1 | 4/2007 | Jackson |
| 7,229,168 B2 | 6/2007 | Kidouchim |
| 7,236,356 B2 | 6/2007 | Ulla et al. |
| 7,320,514 B2 | 1/2008 | Smith |
| 7,409,234 B2 | 8/2008 | Glezerman |
| 7,435,019 B2 | 10/2008 | Lee |
| 7,597,440 B1 | 10/2009 | Magal |
| 7,618,260 B2 | 11/2009 | Daniel et al. |
| 7,684,868 B2 | 3/2010 | Tai et al. |
| 7,793,361 B2 | 9/2010 | Ishihara et al. |
| 7,937,880 B1 | 5/2011 | Fidlow |
| 7,979,963 B2 | 7/2011 | Lee-Holowka et al. |
| 7,988,283 B2 | 8/2011 | Jannard |
| 8,046,948 B2 | 11/2011 | Mauch et al. |
| 8,068,169 B2 | 11/2011 | Chang |
| D653,202 S | 1/2012 | Hasbrook et al. |
| 8,109,629 B2 | 2/2012 | Howell et al. |
| 8,111,042 B2 | 2/2012 | Bennett |
| 8,123,352 B2 | 2/2012 | Matsumoto et al. |
| D659,094 S | 5/2012 | Brand et al. |
| 8,175,660 B2 | 5/2012 | Porwal |
| 8,193,781 B2 | 6/2012 | Lin et al. |
| D666,144 S | 8/2012 | Brand et al. |
| 8,299,877 B2 | 10/2012 | Hong et al. |
| D670,703 S | 11/2012 | Hasbrook et al. |
| D671,493 S | 11/2012 | Hasbrook et al. |
| 8,334,620 B2 | 12/2012 | Park et al. |
| D675,625 S | 2/2013 | Hasbrook et al. |
| D676,432 S | 2/2013 | Hasbrook et al. |
| 8,367,235 B2 | 2/2013 | Huang |
| 8,378,524 B2 | 2/2013 | Mita |
| 8,401,595 B2 | 3/2013 | Zhu et al. |
| 8,432,129 B2 | 4/2013 | Lee et al. |
| 8,469,508 B2 | 6/2013 | Silver et al. |
| 8,473,004 B2 | 6/2013 | Warren |
| 8,493,287 B2 | 7/2013 | Yamamoto |
| 8,534,514 B2 | 9/2013 | Zhu et al. |
| 8,541,975 B2 | 9/2013 | Park et al. |
| 8,571,609 B2 | 10/2013 | Hwang et al. |
| 8,587,241 B2 | 11/2013 | Maeda |
| 8,653,909 B2 | 2/2014 | Park et al. |
| 8,716,899 B2 | 5/2014 | Yi et al. |
| 8,754,548 B2 | 6/2014 | Hong et al. |
| 8,778,022 B2 | 7/2014 | Blum et al. |
| 8,787,970 B2 | 7/2014 | Warren |
| 8,823,215 B2 | 9/2014 | Park et al. |
| 8,829,724 B2 | 9/2014 | Ryu et al. |
| 8,830,888 B2 | 9/2014 | Shin et al. |
| 8,842,635 B2 | 9/2014 | Kim et al. |
| 8,868,140 B2 | 10/2014 | Zhu et al. |
| 8,890,954 B2 | 11/2014 | O'Donnell et al. |
| 8,896,694 B2 | 11/2014 | O'Donnell et al. |
| 8,915,588 B2 | 12/2014 | Blum et al. |
| 8,922,161 B2 | 12/2014 | Choi et al. |
| 8,927,881 B2 | 1/2015 | Wittenberg et al. |
| 8,929,245 B2 | 1/2015 | Sivanesan et al. |
| 8,931,896 B2 | 1/2015 | Blum et al. |
| 8,934,045 B2 | 1/2015 | Karn et al. |
| 8,957,629 B2 | 2/2015 | Ryu et al. |
| 8,971,039 B2 | 3/2015 | Huang et al. |
| 8,987,942 B2 | 3/2015 | Kim et al. |
| D726,140 S | 4/2015 | Park et al. |
| D729,650 S | 5/2015 | Phillips et al. |
| 9,024,484 B2 | 5/2015 | Park et al. |
| 9,026,165 B2 | 5/2015 | Kim et al. |
| 9,030,052 B2 | 5/2015 | Kim et al. |
| 9,048,682 B2 | 6/2015 | Lee et al. |
| 9,048,683 B2 | 6/2015 | Lee et al. |
| 9,048,695 B2 | 6/2015 | Hwang et al. |
| 9,065,488 B2 | 6/2015 | Kim et al. |
| 9,075,249 B2 | 7/2015 | Heinrich et al. |
| 9,088,167 B2 | 7/2015 | Kim et al. |
| 9,088,171 B2 | 7/2015 | Won et al. |
| 9,122,083 B2 | 9/2015 | Blum et al. |
| 9,152,130 B2 | 10/2015 | Pattikonda et al. |
| D742,372 S | 11/2015 | Christopher et al. |
| D755,787 S | 5/2016 | Zander et al. |
| 9,380,374 B2 | 6/2016 | Sprague et al. |
| D766,770 S | 9/2016 | Devaney et al. |
| 2004/0080299 A1 | 4/2004 | Forster et al. |
| 2004/0088051 A1 | 5/2004 | Seligman |
| 2005/0046786 A1 | 3/2005 | Smith |
| 2005/0083579 A1 * | 4/2005 | Volkenandt ........ G02B 27/0172 359/630 |
| 2005/0088811 A1 | 4/2005 | Ulla et al. |
| 2005/0167558 A1 | 8/2005 | Smith |
| 2005/0248717 A1 | 11/2005 | Howell et al. |
| 2006/0004546 A1 | 1/2006 | Slanec |
| 2006/0034478 A1 | 2/2006 | Davenport |
| 2006/0082730 A1 | 4/2006 | Franks |
| 2006/0095128 A1 | 5/2006 | Blum et al. |
| 2006/0121639 A1 | 6/2006 | Tai et al. |
| 2006/0268217 A1 | 11/2006 | Teng |
| 2007/0009253 A1 | 1/2007 | Nikkanen et al. |
| 2007/0013864 A1 | 1/2007 | Dietz |
| 2007/0023496 A1 | 2/2007 | Hall |
| 2007/0030442 A1 * | 2/2007 | Howell ................ G02C 11/10 351/158 |
| 2007/0153639 A1 | 7/2007 | Lafever et al. |
| 2008/0034637 A1 * | 2/2008 | Summers ................ F41G 1/00 42/111 |
| 2008/0088791 A1 | 4/2008 | Smith |
| 2008/0116847 A1 | 5/2008 | Loke et al. |
| 2008/0163536 A1 | 7/2008 | Koch et al. |

(56) References Cited

U.S. PATENT DOCUMENTS

| | | | |
|---|---|---|---|
| 2008/0180537 A1* | 7/2008 | Weinberg | H04N 5/2256 348/211.99 |
| 2008/0208335 A1 | 8/2008 | Blum et al. | |
| 2008/0231721 A1 | 9/2008 | Chou et al. | |
| 2008/0259269 A1 | 10/2008 | Grogan et al. | |
| 2008/0301846 A1 | 12/2008 | Brillouet | |
| 2009/0009410 A1 | 1/2009 | Dolgin et al. | |
| 2009/0040308 A1* | 2/2009 | Temovskiy | F41G 3/16 348/158 |
| 2009/0110386 A1 | 4/2009 | Kamada et al. | |
| 2009/0173760 A1 | 7/2009 | Good | |
| 2009/0207701 A1 | 8/2009 | Jacques | |
| 2009/0243397 A1 | 10/2009 | Cook et al. | |
| 2009/0251661 A1* | 10/2009 | Fuziak, Jr. | G02B 27/0172 351/158 |
| 2009/0264966 A1 | 10/2009 | Blum et al. | |
| 2010/0036773 A1 | 2/2010 | Bennett | |
| 2010/0045114 A1 | 2/2010 | Sample et al. | |
| 2010/0053555 A1* | 3/2010 | Enriquez | A61B 3/113 351/210 |
| 2010/0073262 A1 | 3/2010 | Matsumoto | |
| 2010/0103076 A1 | 4/2010 | Yamamoto | |
| 2010/0157432 A1* | 6/2010 | Sugihara | G02B 27/0172 359/630 |
| 2010/0164295 A1 | 7/2010 | Ichikawa et al. | |
| 2010/0174629 A1 | 7/2010 | Taylor et al. | |
| 2010/0177476 A1 | 7/2010 | Hotelling et al. | |
| 2010/0187910 A1 | 7/2010 | Brengauz | |
| 2010/0245757 A1 | 9/2010 | Sugihara et al. | |
| 2010/0284683 A1 | 11/2010 | Fressola et al. | |
| 2010/0319096 A1 | 12/2010 | Scott et al. | |
| 2011/0115429 A1 | 5/2011 | Toivola et al. | |
| 2011/0156639 A1 | 6/2011 | Ryu et al. | |
| 2011/0184320 A1 | 7/2011 | Shipps et al. | |
| 2011/0185538 A1 | 8/2011 | Hotellier et al. | |
| 2011/0188677 A1 | 8/2011 | Rothkopf et al. | |
| 2011/0193963 A1 | 8/2011 | Hess et al. | |
| 2011/0221389 A1 | 9/2011 | Won et al. | |
| 2011/0221390 A1 | 9/2011 | Won et al. | |
| 2011/0222154 A1 | 9/2011 | Choi et al. | |
| 2011/0225073 A1 | 9/2011 | Won et al. | |
| 2011/0234012 A1 | 9/2011 | Yi et al. | |
| 2011/0241438 A1 | 10/2011 | Kim et al. | |
| 2011/0241612 A1 | 10/2011 | Ryu et al. | |
| 2012/0062173 A1 | 3/2012 | Choi et al. | |
| 2012/0075571 A1 | 3/2012 | Silver | |
| 2012/0081658 A1 | 4/2012 | Sugihara et al. | |
| 2012/0105740 A1 | 5/2012 | Jannard et al. | |
| 2012/0127423 A1 | 5/2012 | Blum et al. | |
| 2012/0153903 A1 | 6/2012 | Kim et al. | |
| 2012/0164943 A1 | 6/2012 | Bennett | |
| 2012/0169278 A1 | 7/2012 | Choi et al. | |
| 2012/0193996 A1 | 8/2012 | Ryu et al. | |
| 2012/0280575 A1 | 11/2012 | Kim et al. | |
| 2012/0286581 A1 | 11/2012 | Ryu et al. | |
| 2012/0286582 A1 | 11/2012 | Kim et al. | |
| 2012/0286726 A1 | 11/2012 | Kim et al. | |
| 2012/0293008 A1 | 11/2012 | Park et al. | |
| 2012/0293009 A1 | 11/2012 | Kim et al. | |
| 2012/0293010 A1 | 11/2012 | Lee et al. | |
| 2012/0294478 A1* | 11/2012 | Publicover | G06K 9/00604 382/103 |
| 2012/0299390 A1 | 11/2012 | Kim et al. | |
| 2012/0300872 A1 | 11/2012 | Kim et al. | |
| 2012/0306269 A1 | 12/2012 | Kim et al. | |
| 2012/0306284 A1 | 12/2012 | Lee et al. | |
| 2012/0309304 A1 | 12/2012 | Kim et al. | |
| 2012/0309305 A1 | 12/2012 | Kim et al. | |
| 2012/0309306 A1 | 12/2012 | Kim et al. | |
| 2012/0309308 A1 | 12/2012 | Kim et al. | |
| 2012/0313445 A1 | 12/2012 | Park et al. | |
| 2012/0313447 A1 | 12/2012 | Park et al. | |
| 2012/0328043 A1 | 12/2012 | Kwon et al. | |
| 2012/0329405 A1 | 12/2012 | Lee et al. | |
| 2013/0015813 A1 | 1/2013 | Kim et al. | |
| 2013/0026847 A1 | 1/2013 | Kim et al. | |
| 2013/0033117 A1 | 2/2013 | Kim et al. | |
| 2013/0035034 A1 | 2/2013 | Kim et al. | |
| 2013/0039395 A1 | 2/2013 | Norconk et al. | |
| 2013/0043734 A1 | 2/2013 | Stone et al. | |
| 2013/0043737 A1 | 2/2013 | Yeo et al. | |
| 2013/0049456 A1 | 2/2013 | Kim et al. | |
| 2013/0049483 A1 | 2/2013 | Kim et al. | |
| 2013/0057079 A1 | 3/2013 | Park et al. | |
| 2013/0058379 A1 | 3/2013 | Kim et al. | |
| 2013/0058380 A1 | 3/2013 | Kim et al. | |
| 2013/0059533 A1 | 3/2013 | Kwon et al. | |
| 2013/0062963 A1 | 3/2013 | Chemokalov et al. | |
| 2013/0062964 A1 | 3/2013 | Chemokalov et al. | |
| 2013/0062965 A1 | 3/2013 | Chemokalov et al. | |
| 2013/0063082 A1 | 3/2013 | Lee et al. | |
| 2013/0063083 A1 | 3/2013 | Park et al. | |
| 2013/0063873 A1 | 3/2013 | Wodrich et al. | |
| 2013/0082651 A1 | 4/2013 | Park et al. | |
| 2013/0093255 A1 | 4/2013 | Jung et al. | |
| 2013/0099588 A1 | 4/2013 | Yeo et al. | |
| 2013/0099591 A1 | 4/2013 | Yeo et al. | |
| 2013/0099732 A1 | 4/2013 | Lee et al. | |
| 2013/0099733 A1 | 4/2013 | Park et al. | |
| 2013/0099734 A1 | 4/2013 | Lee et al. | |
| 2013/0101133 A1 | 4/2013 | Yoon et al. | |
| 2013/0113296 A1 | 5/2013 | Ryu et al. | |
| 2013/0113298 A1 | 5/2013 | Ryu et al. | |
| 2013/0119780 A1 | 5/2013 | Kim et al. | |
| 2013/0119929 A1 | 5/2013 | Partovi | |
| 2013/0127410 A1 | 5/2013 | Park et al. | |
| 2013/0130621 A1 | 5/2013 | Kim et al. | |
| 2013/0134791 A1 | 5/2013 | Park et al. | |
| 2013/0134927 A1 | 5/2013 | Park et al. | |
| 2013/0147427 A1 | 6/2013 | Polu et al. | |
| 2013/0154387 A1 | 6/2013 | Lee et al. | |
| 2013/0154557 A1 | 6/2013 | Lee et al. | |
| 2013/0154558 A1 | 6/2013 | Lee et al. | |
| 2013/0162200 A1 | 6/2013 | Terry et al. | |
| 2013/0176652 A1 | 7/2013 | Kim et al. | |
| 2013/0176653 A1 | 7/2013 | Kim et al. | |
| 2013/0181665 A1 | 7/2013 | Lee et al. | |
| 2013/0187475 A1 | 7/2013 | Vendik et al. | |
| 2013/0187598 A1 | 7/2013 | Park et al. | |
| 2013/0200844 A1 | 8/2013 | Lee et al. | |
| 2013/0207479 A1 | 8/2013 | Vendik et al. | |
| 2013/0207851 A1 | 8/2013 | Dabov | |
| 2013/0210378 A1 | 8/2013 | Zhu et al. | |
| 2013/0214734 A1 | 8/2013 | Kang et al. | |
| 2013/0214735 A1 | 8/2013 | Kang et al. | |
| 2013/0215374 A1 | 8/2013 | Blum et al. | |
| 2013/0216085 A1 | 8/2013 | Honeycutt | |
| 2013/0221912 A1 | 8/2013 | Kang et al. | |
| 2013/0221914 A1 | 8/2013 | Kim et al. | |
| 2013/0221915 A1 | 8/2013 | Son et al. | |
| 2013/0225082 A1 | 8/2013 | Kang et al. | |
| 2013/0229614 A1 | 9/2013 | Marini et al. | |
| 2013/0235332 A1 | 9/2013 | Blum et al. | |
| 2013/0241308 A1 | 9/2013 | Bilbrey et al. | |
| 2013/0249306 A1 | 9/2013 | Kim et al. | |
| 2013/0250135 A1 | 9/2013 | Blum et al. | |
| 2013/0264997 A1 | 10/2013 | Lee et al. | |
| 2013/0270920 A1 | 10/2013 | Yoon et al. | |
| 2013/0278072 A1 | 10/2013 | Yoon et al. | |
| 2013/0278207 A1 | 10/2013 | Yoo | |
| 2013/0282117 A1 | 10/2013 | Van Heugten et al. | |
| 2013/0329183 A1 | 12/2013 | Blum et al. | |
| 2014/0021796 A1 | 1/2014 | Song et al. | |
| 2014/0022765 A1 | 1/2014 | Waters | |
| 2014/0027521 A1 | 1/2014 | Pedicano et al. | |
| 2014/0043580 A1 | 2/2014 | Steele | |
| 2014/0044281 A1 | 2/2014 | Ganem et al. | |
| 2014/0049211 A1 | 2/2014 | Park et al. | |
| 2014/0058506 A1 | 2/2014 | Tai et al. | |
| 2014/0062395 A1 | 3/2014 | Kwon | |
| 2014/0070623 A1 | 3/2014 | Keeling et al. | |
| 2014/0070624 A1 | 3/2014 | Kim et al. | |
| 2014/0070625 A1 | 3/2014 | Kim et al. | |

(56) References Cited

U.S. PATENT DOCUMENTS

| | | |
|---|---|---|
| 2014/0071644 A1 | 3/2014 | Yoon et al. |
| 2014/0077613 A1 | 3/2014 | Song et al. |
| 2014/0077614 A1 | 3/2014 | Park et al. |
| 2014/0084688 A1 | 3/2014 | Tzanidis et al. |
| 2014/0084858 A1 | 3/2014 | Kim et al. |
| 2014/0103873 A1 | 4/2014 | Partovi et al. |
| 2014/0111018 A1 | 4/2014 | Kwon et al. |
| 2014/0111153 A1 | 4/2014 | Kwon et al. |
| 2014/0113689 A1 | 4/2014 | Lee |
| 2014/0125278 A1 | 5/2014 | Kim et al. |
| 2014/0135592 A1 | 5/2014 | Ohnemus et al. |
| 2014/0139180 A1 | 5/2014 | Kim et al. |
| 2014/0139637 A1 | 5/2014 | Mistry et al. |
| 2014/0146282 A1 | 5/2014 | Lu |
| 2014/0152116 A1 | 6/2014 | Kim et al. |
| 2014/0152516 A1 | 6/2014 | Kim et al. |
| 2014/0159654 A1 | 6/2014 | Lee et al. |
| 2014/0183967 A1 | 7/2014 | Ryu et al. |
| 2014/0191593 A1 | 7/2014 | Moh |
| 2014/0197785 A1 | 7/2014 | Lee et al. |
| 2014/0203657 A1 | 7/2014 | Song et al. |
| 2014/0232980 A1 | 8/2014 | Harms et al. |
| 2014/0239280 A1 | 8/2014 | Takada et al. |
| 2014/0241555 A1 | 8/2014 | Terlizzi |
| 2014/0252875 A1 | 9/2014 | Lee |
| 2014/0253028 A1 | 9/2014 | Lee et al. |
| 2014/0253322 A1 | 9/2014 | Chapin |
| 2014/0265614 A1 | 9/2014 | Kim et al. |
| 2014/0265615 A1 | 9/2014 | Kim et al. |
| 2014/0266020 A1 | 9/2014 | van Lammeren et al. |
| 2014/0266988 A1 | 9/2014 | Fisher et al. |
| 2014/0267874 A1 | 9/2014 | Ratcliff et al. |
| 2014/0268017 A1 | 9/2014 | Sweis et al. |
| 2014/0285139 A1 | 9/2014 | Ahn et al. |
| 2014/0285141 A1 | 9/2014 | Lee et al. |
| 2014/0285142 A1 | 9/2014 | Lee et al. |
| 2014/0285416 A1 | 9/2014 | Priyantha et al. |
| 2014/0308987 A1 | 10/2014 | Wilson et al. |
| 2014/0312834 A1 | 10/2014 | Tanabe et al. |
| 2014/0313471 A1 | 10/2014 | Eubanks |
| 2014/0327319 A1 | 11/2014 | Byun et al. |
| 2014/0327393 A1 | 11/2014 | Lee et al. |
| 2014/0327409 A1 | 11/2014 | Lee et al. |
| 2014/0340033 A1 | 11/2014 | Kim et al. |
| 2014/0346888 A1 | 11/2014 | Kim et al. |
| 2014/0347006 A1 | 11/2014 | Kim et al. |
| 2014/0354880 A1 | 12/2014 | Han |
| 2014/0361736 A1 | 12/2014 | Kwon et al. |
| 2014/0361738 A1 | 12/2014 | Lee et al. |
| 2014/0375246 A1 | 12/2014 | Boysen, III et al. |
| 2014/0375256 A1 | 12/2014 | Lee et al. |
| 2015/0046418 A1 | 2/2015 | Akbacak et al. |
| 2015/0049001 A1 | 2/2015 | Rahman et al. |
| 2015/0049201 A1 | 2/2015 | Liu et al. |
| 2015/0060506 A1 | 3/2015 | Cameron et al. |
| 2015/0061589 A1 | 3/2015 | Wodrich et al. |
| 2015/0103304 A1 | 4/2015 | Darcy |
| 2015/0168729 A1* | 6/2015 | Kobayashi ............ G06T 19/006 345/156 |
| 2015/0180286 A1 | 6/2015 | Asanuma et al. |
| 2015/0193980 A1 | 7/2015 | Pedley |
| 2015/0204949 A1 | 7/2015 | Von Novak, III |
| 2015/0236521 A1 | 8/2015 | Park et al. |
| 2015/0244204 A1 | 8/2015 | Lee et al. |
| 2015/0244341 A1 | 8/2015 | Ritter et al. |
| 2015/0244427 A1 | 8/2015 | Kim et al. |
| 2015/0244910 A1* | 8/2015 | Marston ................ G02C 11/10 348/294 |
| 2015/0249361 A1 | 9/2015 | Kim et al. |
| 2015/0249916 A1 | 9/2015 | Schlub et al. |
| 2015/0256021 A1 | 9/2015 | Kwon et al. |
| 2016/0026156 A1 | 1/2016 | Jackson et al. |
| 2016/0033792 A1 | 2/2016 | Blum et al. |
| 2016/0072296 A1 | 3/2016 | Nejatali et al. |
| 2016/0172870 A1 | 6/2016 | Blum et al. |
| 2016/0182826 A1 | 6/2016 | Blum et al. |
| 2016/0190859 A1 | 6/2016 | Blum et al. |
| 2016/0203359 A1 | 7/2016 | von und zu Liechtenstein |
| 2016/0206056 A1 | 7/2016 | Pluemer et al. |
| 2016/0261147 A1 | 9/2016 | Blum et al. |
| 2016/0294225 A1 | 10/2016 | Blum et al. |

FOREIGN PATENT DOCUMENTS

| | | |
|---|---|---|
| CN | 202407553 | 9/2012 |
| CN | 202419070 | 9/2012 |
| CN | 202424276 | 9/2012 |
| CN | 202424277 | 9/2012 |
| CN | 202424278 | 9/2012 |
| CN | 202424279 | 9/2012 |
| CN | 202424807 | 9/2012 |
| CN | 102777487 | 11/2012 |
| CN | 202635909 | 1/2013 |
| CN | 202635910 | 1/2013 |
| CN | 202635911 | 1/2013 |
| CN | 202636015 | 1/2013 |
| CN | 202647093 | 1/2013 |
| CN | 202647094 | 1/2013 |
| CN | 202647101 | 1/2013 |
| CN | 202647104 | 1/2013 |
| CN | 202647111 | 1/2013 |
| CN | 202649874 | 1/2013 |
| CN | 202649875 | 1/2013 |
| CN | 202651825 | 1/2013 |
| CN | 202652281 | 1/2013 |
| CN | 202652282 | 1/2013 |
| CN | 202652304 | 1/2013 |
| CN | 202652305 | 1/2013 |
| CN | 202800463 | 3/2013 |
| CN | 202800547 | 3/2013 |
| CN | 202811809 | 3/2013 |
| CN | 202818399 | 3/2013 |
| CN | 202904151 U | 4/2013 |
| CN | 203178585 | 9/2013 |
| DE | 202009015991 | 4/2010 |
| EP | 0736268 | 9/1996 |
| ES | 2165795 | 3/2002 |
| JP | 07099596 A * | 4/1995 |
| JP | 2000138858 A | 5/2000 |
| KR | 20140091195 A | 7/2014 |
| KR | 101646541 | 8/2016 |
| TW | M300818 U | 11/2006 |
| TW | M395176 U | 12/2010 |
| WO | 9208157 A1 | 5/1992 |
| WO | 0106298 A1 | 1/2001 |
| WO | 02/45044 A1 | 6/2002 |
| WO | 2009/052705 A1 | 4/2009 |
| WO | 2011041733 A1 | 4/2011 |
| WO | 2012/039738 A1 | 3/2012 |
| WO | 2012/093986 A1 | 7/2012 |
| WO | 2013118162 A1 | 8/2013 |
| WO | 2013/188343 A1 | 12/2013 |
| WO | 2014/012536 A1 | 1/2014 |
| WO | 2014012451 A1 | 1/2014 |
| WO | 2014/102536 A1 | 7/2014 |
| WO | 2014122538 A2 | 8/2014 |
| WO | 2016022499 A1 | 2/2016 |

OTHER PUBLICATIONS

Blum, Ronald D. et al. Design U.S. Appl. No. 29/556,571, entitled "Eyewear Temple", filed Mar. 1, 2016, pp. all.

Blum, Ronald D. et al. U.S. Appl. No. 15/179,018, entitled "Eyewear With Magnetic Track for Electronic Wearable Device", filed Jun. 10, 2016, pp. All.

Blum, Ronald D. et al. U.S. Appl. No. 15/337,796, entitled "Hearing Aid Adapted for Wireless Power Reception", filed Oct. 28, 2016, pp. all.

"Make Your Watch Smart!", http://www.ct-band.com/en/; captured Nov. 10, 2016, pp. all.

"Sleepsport Band", http://www.officesupplynow.com/xcart/GRFGB40139-Griffin-Case-sleepsport-Band-bk.

(56) References Cited

OTHER PUBLICATIONS html?gclid=CjwKEAjwnebABRCjpvr13dHL8DsSJABB-ILJBcOqYMmKeCs3g__rcvbST3HVWtuup__HzVQ3-Iv5YFOBoCcK_w_wcB; captured Nov. 10, 2016, pp. all.

"Kairos T-Band Only", https://kairoswatches.com/tbands/tband/tband/; captured Nov. 10, 2016, pp. all.

"Glance: World'S First Smart Accessory for Your Watch", https://www.kickstarter.com/projects/1742184757/glance-worlds-first-smart-accessory-for-your-watch; captured Nov. 10, 2016, pp. all.

"Fitbit Pouch for Watch Strap", https://www.etsy.com/listing/186507712/fitbit-pouch-for-watch-strap; captured Nov. 10, 2016, pp. all.

"Classi: The World'S First Leather Smart Strap for Classic Watches", http://www.maintool.me/classi.html; captured Nov. 10, 2016, pp. all.

"Marathon Watch Band Clip Compass", http://www.chronoworld.com/marathon-watch-band-clip-compass-co194004.html; captured Nov. 10, 2016, pp. all.

"Modillion Turns Any "Dumb" Watch Into a Smart Watch", http://newatlas.com/modillian-smartwatch-strap/32059/; captured Nov. 10, 2016, pp. all.

"Wearable Technology Meets the Art of Fine Watchmaking", http://www.montblanc.com/en-us/discover/specials/montblanc-introduces-e-strap.html; captured Nov. 10, 2016, pp. all.

"Multi Functional Pouch Armband Ankel Band Wristband for Fitbit Flex Fitbit One Clip . . . ", https://www.amazon.com/functional-armband-wristband-smartband-withings/dp/B00WALZXCW; captured Nov. 10, 2016, pp. all.

"Review of 1BANDID Sports & GPS Watch ID Bands", https://www.dcrainmaker.com/2011/09/review-of-1bandid-sports-gps-watch-id.html; captured Nov. 10, 2016, pp. all.

"This Weird Strap Lets You Make Phone Calls From Your Regular Watch", https://www.kickstarter.com/projects/hotsmartwatch/hot-band-the-smart-watch-band-for-any-watch?token=5d08da6f; captured Nov. 10, 2016, pp. all.

"Skyview Pinnacle", https://www.nicogerard.com/nico-gerard-skyview-pinnacle; captured Nov. 10, 2016, pp. all.

"Custom Watchband Holder for Fitbit Flex", http://www.shapeways.com/product/YWXHN5VYP/custom-watchband-holder-for-fitbit-flex?optionId=17995763; captured Nov. 10, 2016, pp. all.

""Unique" Hand-Made Strap Discretely Adds Smart Features to Any Watch", http://newatlas.com/unique-smartwatch-strap/39458/; captured Nov. 10, 2016, pp. all.

"Transform Your Wristwatch Into a Smart Device", http://www.wotch.de/; captured Nov. 10, 2016, pp. all.

\* cited by examiner

WEARABLE CAMERA SYSTEMS AND APPARATUS FOR ALIGNING AN EYEWEAR CAMERA

CROSS-REFERENCE TO RELATED APPLICATIONS

This application claims the benefit under 35 U.S.C. 119 of the earlier filing date of U.S. Provisional Application 62/039,997 entitled "CAMERA EYEWEAR WITH OPTIONAL PASSIVE VIEW FINDER", filed Aug. 21, 2014 and U.S. Provisional Application 62/045,246 entitled "MULTI-USE ATTACHABLE EYEGLASS CAMERA", filed Sep. 3, 2014. The aforementioned provisional applications are hereby incorporated by reference in their entirety, for any purpose.

This application is also a continuation-in-part of pending U.S. patent application Ser. No. 14/816,995 entitled "WEARABLE CAMERA SYSTEMS AND APPARATUS AND METHOD FOR ATTACHING CAMERA SYSTEMS OR OTHER ELECTRONIC DEVICES TO WEARABLE ARTICLES" filed Aug. 3, 2015; which application claimed priority to U.S. Provisional Application 62/032,589 entitled "EYEWEAR WITH CAMERA SYSTEM AND ATTACHMENT MECHANISM", filed Aug. 3, 2014; U.S. Provisional Application 62/045,246 entitled "MULTI-USE ATTACHABLE EYEGLASS CAMERA", filed Sep. 3, 2014; U.S. Provisional Application 62/086,747 entitled "CAMERA SYSTEM FOR EYEWEAR", filed Dec. 3, 2014; U.S. Provisional Application 62/091,697 entitled "EYEWEAR SYSTEM FOR CAMERA", filed Dec. 15, 2014; U.S. Provisional Application 62/153,999 entitled "CAMERA SYSTEM CAPABLE OF WIRELESS ENERGY TRANSFER", filed Apr. 28, 2015; U.S. Provisional Application 62/048,820 entitled "EYEWEAR WITH TEMPLE TRACK", filed Sep. 11, 2014; U.S. Provisional Application 62/052,910 entitled "FASHIONABLE EYEWEAR COMPRISING A TRACK", filed Sep. 19, 2014; U.S. Provisional Application 62/053,275 entitled "EYEWEAR COMPRISING A TRACK", filed Sep. 22, 2014; U.S. Provisional Application 62/140,276 entitled "OPTIMIZED EYEWEAR TRACK AND ATTACHMENT MEANS FOR ELECTRONIC DEVICE," filed Mar. 30, 2015; U.S. Provisional Application 62/154,007 entitled "EYEWEAR TRACK, WIRELESS ENERGY TRANSFER SYSTEM AND ATTACHMENT MEANS FOR ELECTRONIC DEVICE," filed Apr. 28, 2015; and U.S. Provisional Application 62/080,437 entitled "EYEWEAR WITH GUIDE FOR WEARABLE DEVICES", filed Nov. 17, 2014.

The aforementioned applications are hereby incorporated by reference in their entirety, for any purpose.

TECHNICAL FIELD

The present disclosure relates to wearable camera systems including a camera attached to eyewear, and more particularly to apparatus and methods for visualizing an approximation of an image captured by the camera and/or providing an indication of alignment of the camera.

BACKGROUND

Typically, digital cameras include a display such that the user may view an image captured by the camera prior to or after the capture of the image. The display is typically built into the camera. However, this may not be practical in some cases, for example in camera systems which are miniaturized and/or which are attached to wearable articles in a manner in which a display may not be viewable when the camera is in use. For some digital camera systems, the display may be provided on a remote electronic device, for example a handheld computing device (e.g., a smart phone) or a wearable electronic device (e.g., a smart watch). These types of camera systems would typically require wireless communication capability and often may result in higher power usage and/or higher processing capability then may be practical or desirable in some instance. Improvements to wearable camera systems may be desirable.

SUMMARY

The present disclosure relates to wearable camera systems which may include a camera (also referred to herein as eyewear camera) attached to eyewear and which may further include an apparatus for providing an indication of alignment of the camera and/or visualizing an approximation of an image or an approximation of a center of the image to be captured by the camera.

A wearable camera system according to some examples herein may include an eyewear which includes a temple and a lens. The wearable camera system may further include a camera coupled to the eyewear, the camera having a field of view. The wearable camera system may also include a marker coupled to the eyewear, the camera, or both. The marker may be positioned on or in front of the lens of the eyewear at a location such that when a wearer of the eyewear aligns the marker with a target, the field of view of the camera includes the target.

A method for capturing a digital image according to some examples herein may include positioning a marker on or in front of a lens of eyewear, a camera being coupled to the eyewear, aligning the marker with a target, and capturing an image with the camera while maintaining the target in alignment with the marker to include the target in the image.

BRIEF DESCRIPTION OF THE DRAWINGS

Features, aspects and potential advantages of the present disclosure will become apparent from the following detailed description of various embodiments, including the best mode presently contemplated of practicing the invention, when taken in conjunction with the accompanying drawings, in which.

DETAILED DESCRIPTION

Certain details are set forth below to provide a sufficient understanding of embodiments of the present disclosure. However, it will be appreciated by those skilled in the art that some embodiments may not include all details described. In some instances, well-known structures, eyewear and/or camera components, circuits, and controls, have not been shown in order to avoid unnecessarily obscuring the described embodiments of the present disclosure.

Examples of wearable camera systems which include eyewear and a camera coupled to eyewear are described. Systems according to the examples herein may include a marker which may be coupled to the camera, the eyewear, or both. The marker may be positioned on or in front of the lens of the eyewear at a location such that when a wearer of the eyewear aligns the marker with a target, the field of view of the camera includes the target. The marker may be incorporated into an apparatus which is configured to provide an indication of alignment of the camera and/or a visual approximation of an image or an approximation of a center of the image to be captured by the camera. Positioning the marker on or in front of the lens may include positioning the marker in contact with a lens surface (e.g., an optically transparent surface of the lens) or adjacent to a lens surface. For example, the phrase in front of the lens may generally include in front of or adjacent to any lens surface including the inner lens surface (e.g., surface near wearer's eye when the eyewear is worn) or the outer lens surface (e.g., surface opposite the inner lens surface). In some examples, positioning the marker on or in front of the lens may include positioning the marker in optical alignment with a portion of the lens.

Figure 1:
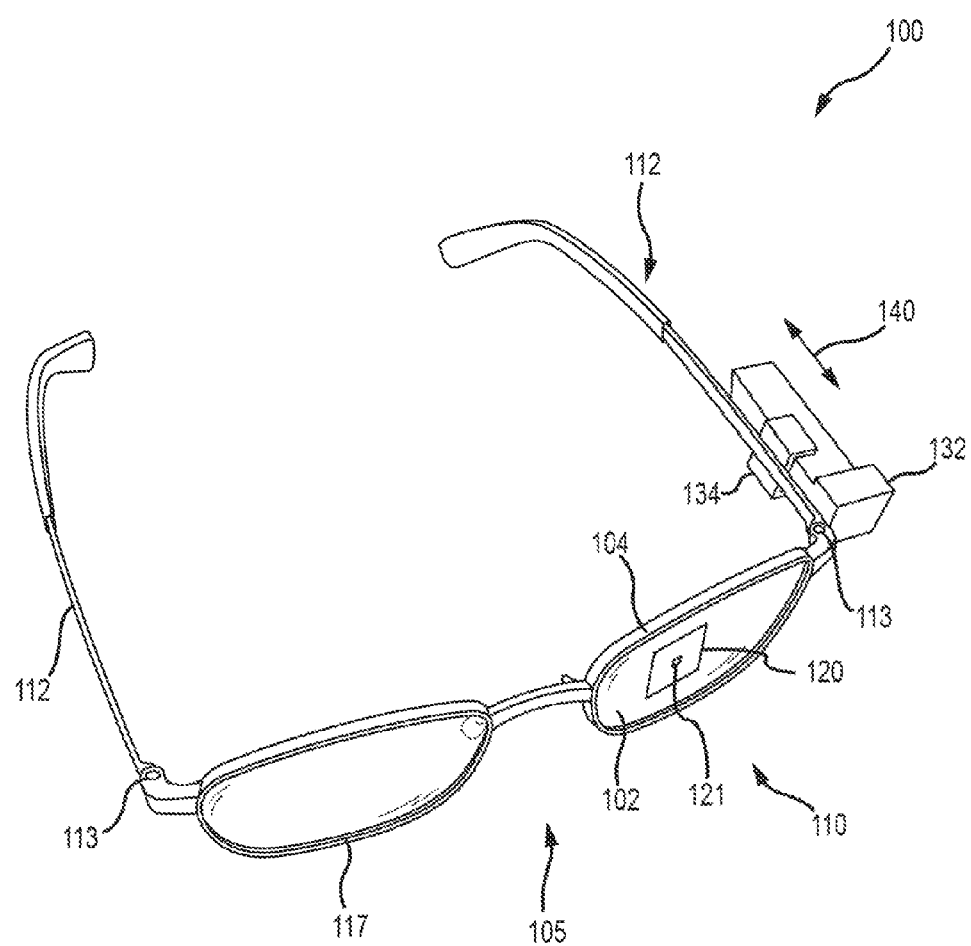
FIG. 1 is a view of a system including a camera movably attached to a temple of eyewear and an image framing apparatus according to examples of the present disclosure.

FIG. 1 is a view of a wearable camera system 100 according to some examples of the present disclosure. The system 100 includes eyewear 105, camera 132 movably coupled to the eyewear 105, and an apparatus 120, which may include a marker 121 as will be described herein. The eyewear 105 includes an eyewear frame 110 which includes a temple 112. Typically, an eyewear frame 110 includes a pair of temples 112 (e.g., left and right temples), one for each side of a wearer's head. In some examples, the temples 112 are pivotably coupled to a lens portion 117 of the frame via a hinge 113. In some examples the temples 112 are integral with the lens portion and/or hinged relative to the lens portion via a living hinge. The lens portion 117 may include a pair of lenses 102, for example and without limitation prescription lenses, non-prescription lenses, tinted lenses, changeable tint lenses, variable focus lenses, switchable focus lenses, or any combinations thereof. The lens portion 117 may include a rim 104, as in the example in FIG. 1. In some examples, the lens portion 117 may rimless or at least partially rimless. The apparatus 120, and marker 121 included therein, may be coupled to the eyewear 105, to the camera 132, or both. The marker may be positioned on or in front of the lens of the eyewear at a location such that when a wearer of the eyewear aligns the marker with a target, the field of view of the camera includes the target.

The camera 132 may be a miniaturized self-contained electronic camera system. The camera 132 may be movably coupled to the temple 112. For example, the system 100 may include an attachment system 134 configured to movably attach the camera 132 to the temple 112. The camera 132 may be slidably and/or removably attached to either of the left temple or the right temple. In some examples, the attachment system may include one or more guides in accordance with examples described in U.S. patent application Ser. No. 14/816,995 entitled "WEARABLE CAMERA SYSTEMS AND APPARATUS AND METHOD FOR ATTACHING CAMERA SYSTEMS OR OTHER ELECTRONIC DEVICES TO WEARABLE ARTICLES, incorporated herein by reference in its entirety for any purpose, for coupling the camera 132 to the temple 112.

In some example, the camera 132 may be devoid of a display. The apparatus 120 may be an image framing apparatus, which may enable the user (e.g., wearer of the eyewear) to perceive an approximate image of the image to be captured by the camera 132. The apparatus 120 (e.g., image framing apparatus) may provide a mechanism for visualizing an approximation of an image to be captured by the camera 132. The image framing apparatus may be a passive device in that it does not require the use of power and/or electrical coupling to the camera. In this regard, the image framing apparatus may also be referred to as passive view finder apparatus or simply a passive view finder. In some examples, the apparatus 120 may be electrically and/or mechanically decoupled from the camera 132. By electrically decoupled, it is generally implied that the apparatus 120 may not be communicatively (e.g., wirelessly) coupled to the camera 132.

In some examples, the camera may be removed from the lens. The camera may be in a location that is different from the location of the marker. The camera may remain in one location, which may be a location in which the camera is not optically aligned with any portion of the lens, while the marker is positioned in the location for targeting the object (e.g., a location such that when the wearer of the eyewear aligns the marker with a target, the field of view of the camera includes the target). The marker and the camera may be separate components and may be in two different locations during use. In some examples, the camera may not be optically aligned with any portion of the lens but may instead be adjacent to the lens by virtue of being coupled to a temple of the eyewear. In some examples, the camera may be separated from the marker and/or the lens, e.g., it may not be part of the lens and/or the marker.

The cameras 132 according to the present disclosure may be a miniaturized self-contained electronic device. The camera 132 may have a length of about 8 mm to about 50 mm. In some examples, the camera 132 may have a length from about 12 mm to about 45 mm. In some examples, the camera 132 may have a length not exceeding 30 mm. In some examples the camera 132 may be about 12 mm long. The camera 132 may have a width of about 6 mm to about 12 mm. In some examples, the camera 132 may be about 8 mm wide. In some example, the camera 132 may have a width not exceeding about 10 mm. In some example, the camera 132 may have a height of about 6 mm to about 12 mm. In some examples, the camera 132 may be about 8 mm high. In some examples, the camera 132 may have a height not exceeding about 10 mm. In some examples, the camera 132 may weigh from about 5 grams to about 10 grams. In some examples the camera 132 may weigh be about 7 grams or less. In some examples, the camera 132 may have a volume of about 6,000 cubic millimeters or less. In some examples, the camera 132 may have a volume of about 3,000 cubic millimeters or less. In some examples, the camera 132 may have a volume of about 2,000 cubic millimeters or less.

In some examples, the camera 132 may be a waterproof camera. In some examples, the camera 132 can be water resistant. In some examples, the camera 132 can be sweat resistant.

Figure 2:
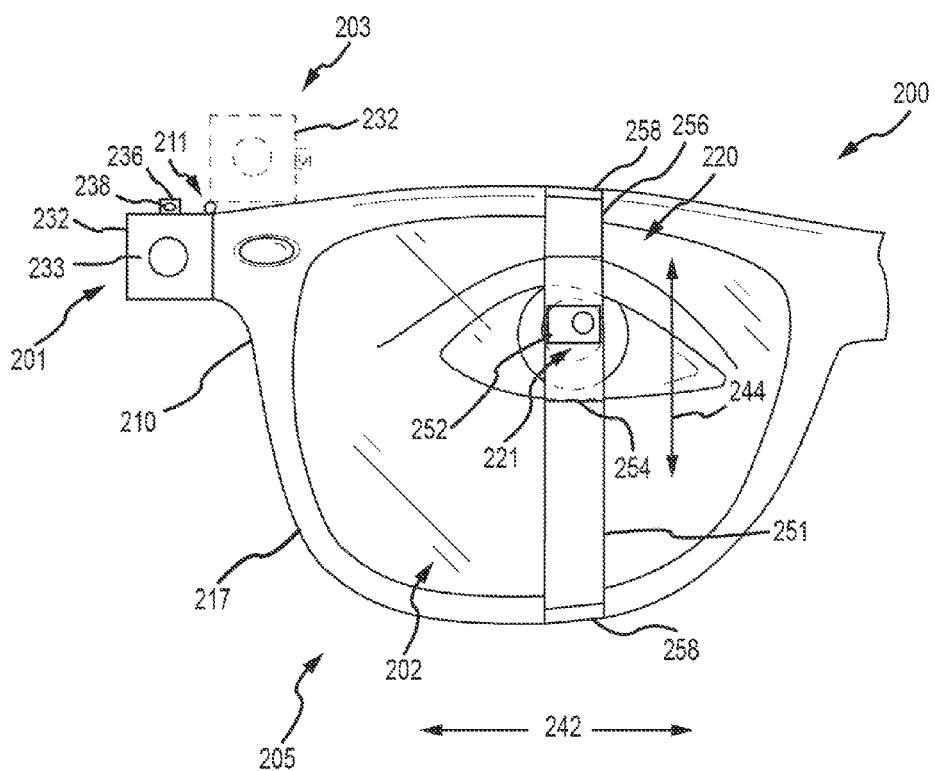
FIG. 2 is a partial view of a system according to some examples herein.

FIG. 2 is a partial view of a system according to some examples herein. The system 200 may include one or more of the components of system 100 described with reference to FIG. 1. Accordingly, similar components may be indicated with like number where the first numeral of the reference number corresponds to the figure number, for example camera 232 may be similar to camera 132 and include one or more of the components of functionality of camera 132 the description of which may not be repeated in the interest of brevity and conciseness of the disclosure.

The system 200 may include an eyewear 205 and camera 232. The eyewear 205 may include an eyewear frame 210, which includes a temple and a lens portion 217. The eyewear 205 may include a lens 205 in the lens portion 217. The camera 232 may be movably coupled to the temple of eyewear 205. In some examples, the camera 232 is slidably coupled to the temple (not shown in FIG. 2) such that the camera 232 may be translated along a length of the temple, e.g., between a first or forward position to a second of aft position. In the forward position, e.g., as illustrated in FIG. 2, a forward portion of the camera 232 may be aligned or substantially aligned with a forward portion of the eyewear frame 210. In some examples, the camera 232 may be slightly ahead of the forward portion of the eyewear frame 210 when the camera 232 is in the forward position. The camera 232 may be positionable to a second position, which may correspond to a location along the length of the temple in which the camera 232 is substantially concealed from view. In the second position, the camera 232 may be substantially concealed behind an ear of the wearer. In some examples, the attachment system may be configured such that the camera 232 is movable to a position near a curved portion of the temple such that the camera 232 is positionable adjacent to or behind an ear of the wearer. In the second position, the camera 232 may be substantially concealed behind an ear of the wearer.

The wearable camera system 200 may be configured to capture a landscape image, a portrait image, or both. In some examples, the camera 232 may be pivotably coupled to the temple, for example via a hinge joint 211 or other type of pivotal joint, such that the camera 232 may be rotated between a first orientation 201 and a second orientation 203. The camera 232 may be pivotable about an axis of the temple. In some examples, the camera 232 may be pivotable between a first orientation, which may be an orientation in which the camera is adjacent to the outside side of the temple, and a second orientation, which may be an orientation in which the camera is adjacent to another side of the temple, for example a top or a bottom side of the temple. The camera 232 may be configured to capture a landscape image in one or the first or second orientation and capture a portrait image in the other one of the first or second orientation. It will be appreciated that the camera may be coupled to any side of the temple and pivotable to position the camera in any orientation with respect to the temple thereby changing a rotation angle of the image capture device with respect to a scene to be captured.

The camera 232 according to the present disclosure may be a miniaturized self-contained electronic device and may have one or more of the features of any of the cameras described herein. The camera may have a field of view. In some examples, the camera 232 may include a targeting apparatus 236 which may be positioned proximate to a camera lens 233. The targeting apparatus 236 may be configured to provide an indication of whether a targeted object (or simply target) is within or outside of the field of view of the camera and correspondingly whether the targeted object will be included in an image captured by the camera. The targeting apparatus may be implemented as a laser pointer 238 (e.g., a laser diode), which may be positioned along a side of the camera, e.g., adjacent to a top, a side, or a bottom of the camera. In some examples, the targeting apparatus may be incorporated into the camera body, e.g., enclosed or partially enclosed within a housing of the camera. The beam of the laser pointer may be generally parallel to the line of sight of the camera and may provide an indication of an approximate center of an image to be captured by the camera. In this manner, the targeting apparatus may provide a visual confirmation to the user of whether a desired object will be included in an image captured by the camera.

Figure 3:
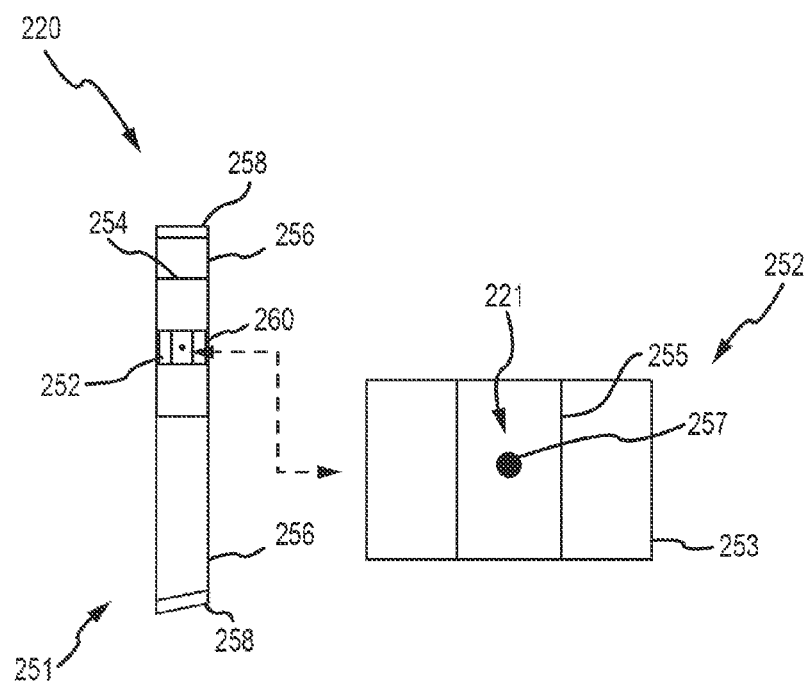
FIG. 3 is a view of the image framing apparatus in FIG. 2.

In some examples, the system 200 may include an image framing apparatus 220 and the image framing apparatus 220 may include the marker 221 (see FIG. 3). The image framing apparatus 220 may be removably coupled to the eyewear 205. The image framing apparatus 220 may include a view finder window 252 which is configured to provide an approximation of an image to be captured by the camera 232. During use, the image framing apparatus 220 may be positioned onto or adjacent to the lens 202 of the eyewear such that the wearer (interchangeably referred to as user herein) may view a scene through the view finder window 252 to perceive an approximation of the scene to be captured by camera 232. To the user, the view finder window 252 may be perceived as a visual disturbance or visual interference within a field of view of the user to provide an indication of an approximate boundary of an image to be captured by the camera. In this manner, a user may be able to approximately frame and thereby reduce the amount of post processing of the image (e.g., cropping the image) even in the absence of view finder on the camera itself or on a remote electronic device communicatively coupled to the camera.

The image framing apparatus 220 may include a body 251 which includes a rigid portion 254. The view finder window may be defined by the rigid portion 254. The view finder window may be implemented as a physical aperture (e.g., an opening) in the rigid portion 254. In some examples, as will be further described, the view finder window may be implemented using an optically transparent material.

The body 251 may include one or more stretchable portions 256 and one or more attachment portions 258, configured to movably couple the image framing apparatus 220 to the eyewear 205. In this example, the attachment portions 258 are implemented as hooks which are shaped to fit around respective edges of the rim to secure the image framing apparatus 220 to the eyewear 205. The stretchable portions 256 may be formed of a stretchable plastic material such as rubber, silicon, or any other suitable elastomer. The stretchable portions 256 may be sufficiently stretchable to bias the hooks towards the eyewear frame while enabling the image framing apparatus to be movable (e.g., slidable) along a first direction (e.g., a horizontal direction 242) for aligning of the view finder window with the line of sight of the wearer. The rigid portion 254 may be movably coupled to the stretchable portions 256 such that the view finder window may be adjusted in a second direction (e.g., a vertical direction 244) for further alignment of the view finder window with the line of sight of the wearer.

Figure 4A:
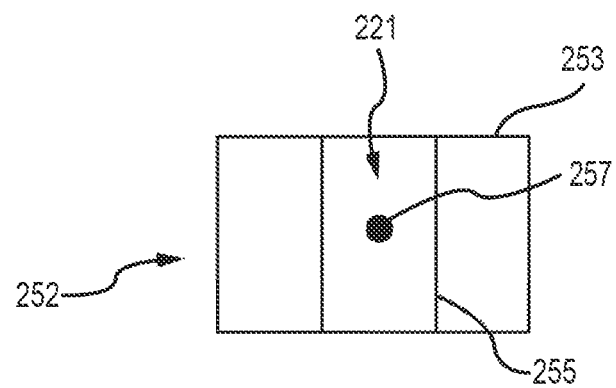
FIGS. 4A-4C are illustrations of view finder windows of image framing apparatuses according to some examples herein.
Figure 4B:
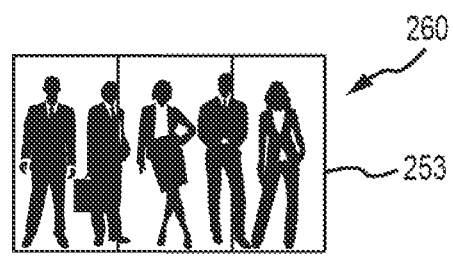
Figure 4C:
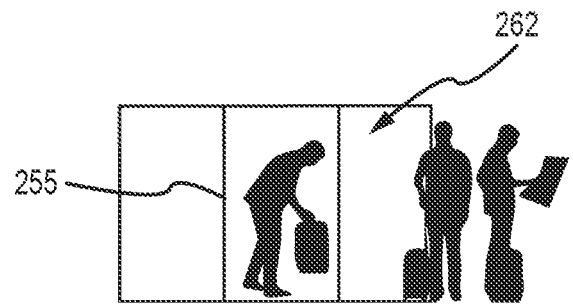

As described, the view finder window 252 may be configured to enable the user to perceive an approximation of an image to be captured. The view finder window 252 may include at least one image frame outline. In some examples and as shown in FIGS. 3 and 4A, the view finder window 252 may include a first image frame outline 253 which may correspond to a landscape image frame. In this manner, the view finder window and more specifically the first image frame outline 253 may enable the user to visualize an approximation of a landscape image 260 as may be captured by camera 232, for example when the camera is provided in the appropriate orientation for capturing a landscape image such as the first orientation. In some examples, the view finder window may include a second image frame outline 255 which may correspond to a portrait image frame thereby enabling the user to visualize an approximation of a portrait image 262 as may be captured by camera 232 when the camera is provided in the appropriate orientation for capturing a portrait image such as the second orientation. In some examples, one of the image frame outlines may be enclosed within the other image frame outline. In the example in FIG. 3, an image frame outline corresponding to a portrait image frame is enclosed by an image frame outline corresponding to a landscape image. In other examples, the image frame outline corresponding to a landscape image frame may be enclosed by an image frame outline corresponding to a portrait image.

In some example, the view finder window 252 may include an image center indicator 257. The image center indicator 257 may enable the user to perceive an approximation of the center of the image to be captured. The image center indicator 257 may facilitate alignment of the image framing apparatus with the user's line of sight, for example by enabling alignment of the view finder window with a pupil of the user's eye. In some examples, the image center indicator may be centered within an image frame outline of the view finder window 252. In some examples the stretchable portion 256 may be implemented as a single strip of optically transparent flexible material (e.g., silicon or clear vinyl) that spans between the attachment portions 258. The rigid portion 254 may be slidably coupled to the stretchable portion 256. The view finder window 252 may be implemented as an opening formed in the rigid portion 254 such that a portion of the flexible material is visible through the opening. The shape of the opening may define the first image frame outline, for example an image frame outline corresponding to a landscape image frame. Vertical lines may be imprinted onto the flexible material, which vertical lines as viewed through the opening may define the second image frame outline, for example an image frame outline corresponding to a portrait image frame. In some examples, the image center indicator 257 may function as the marker 221, in that the image center indicator 257 may be positionable (e.g., by virtue of adjustability of the view finder window 252) to a location such that when the image center indicator 257 with a target, the field of view of the camera includes the target.

In some examples, the view finder window 252 may not include an image center indicator 257. In such example, the view finder window 252 may itself function as the marker. For example, view finder window 252 may be positioned on or in front of the lens at a location such that when the user aligns the view finder window 252 with a target, the field of view of the camera includes the target and the target may thereby be included in an image captured by the camera 232.

In some examples, the image framing apparatus 220 may be tethered to the camera 232, e.g., via a cord, a string, an elastic, or other suitable mechanical connector. In some examples, the camera 232 may include a storage compartment, for example on a bottom, a top, or a side portion of the camera, such that the image capture device 220 may be stowed therein when not in use.

Figure 5:
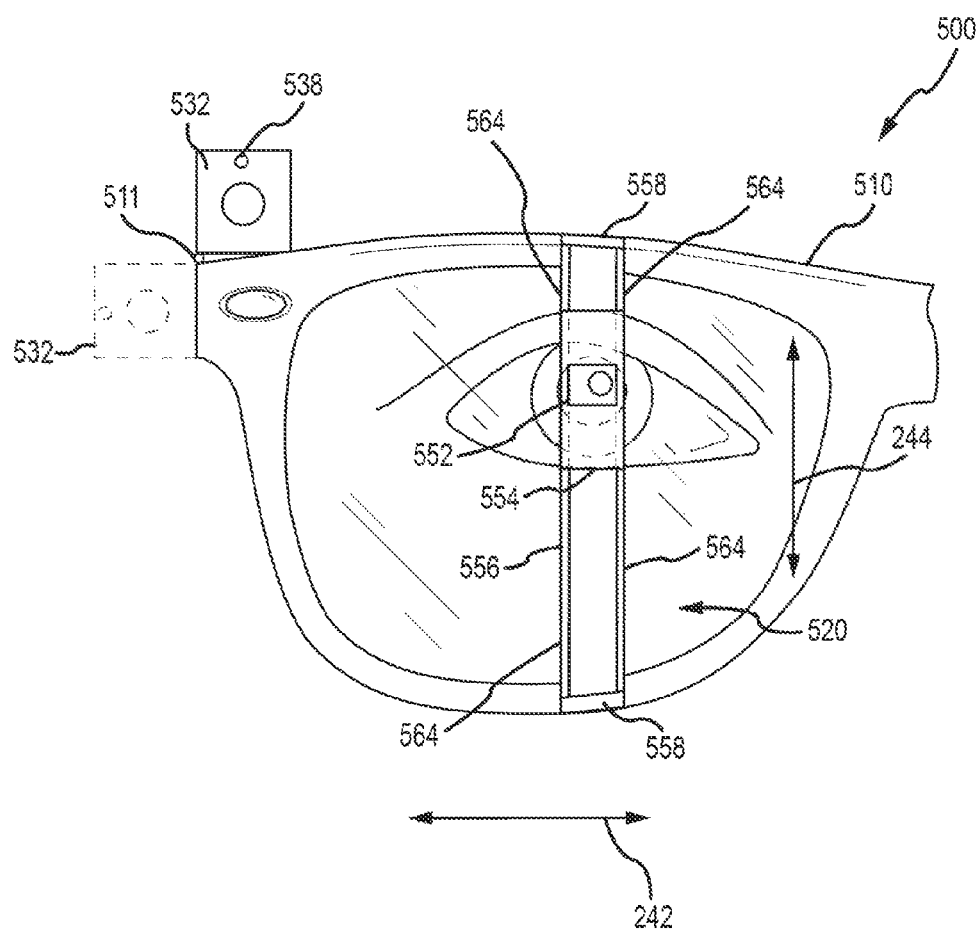
FIG. 5 is a partial view of a system according to further examples herein.

FIG. 5 is a partial view of a system according to further examples herein. The system 500 may include one or more of the components of system 200 described with reference to FIG. 2. As previously noted, similar components may be indicated with like number where the first numeral of the reference number corresponds to the figure number. For example, system 500 may include a camera 532, which may be pivotably coupled to eyewear frame 510, e.g., via a pivot joint 511. The camera may include a targeting apparatus, such as a laser pointer 538. The system 500 may include an image framing apparatus 520, which may include a rigid portion 554, one or more attachment portions 558, and one or more stretchable portions 556 spanning between the attachment portions.

The image framing apparatus 520 may include a view finder window 552 which may be provided in the rigid portion 554. The view finder window 552 may include a marker within the view finder window. In some examples, the view finder window 552 may function as a marker as described herein. The rigid portion 554 may be movably coupled to the stretchable portion 556. In this example, the stretchable portion 556 may be implemented in the form of stretchable rails 564 which may be made of a rubber or other elastomeric material. The rails 564 may be spaced apart from one another by a distance of at least a width of the view finder window 552. The rigid portion may include features for slidably securing the rigid portion to the rails 564 to enable movement of the rigid portion along the direction 244. The image framing apparatus 520 may be movable along the direction 242, for example via the attachment portion 558 (e.g., hooks) provided at each end of the stretchable portion 556.

Figure 6:
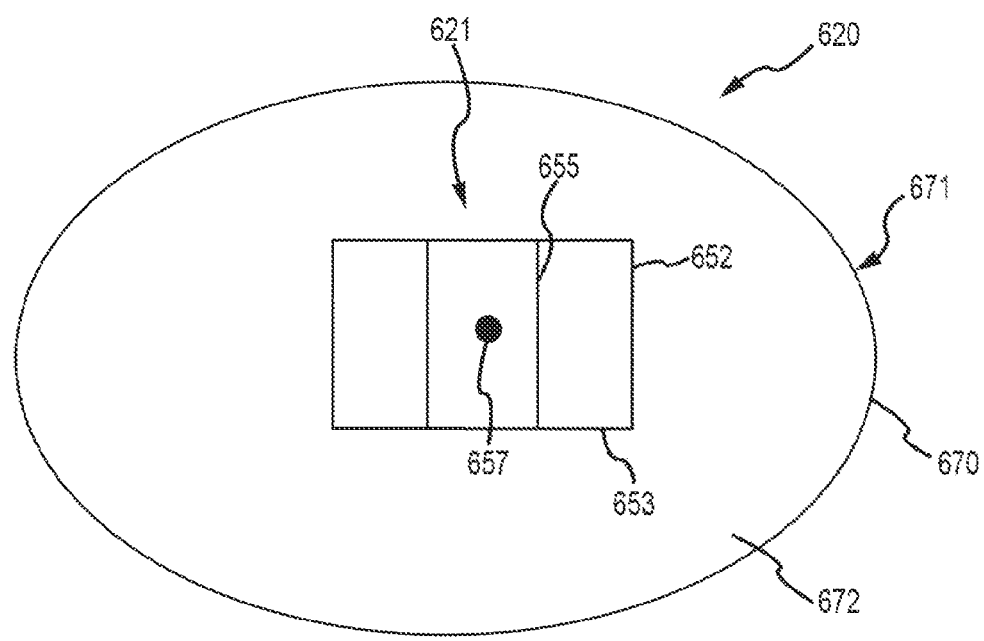
FIG. 6 is a view of an image framing apparatus according to further examples of the present disclosure.

FIG. 6 is a view of an image framing apparatus 620 which includes a marker 621 according to the present disclosure. The image framing apparatus 620 may include a view finder window 652, which may be implemented according to any of the examples herein. In some examples, the view finder window 652 may function as the marker. In some examples, the view finder window 652 may include an image center indicator 657 which may function as the marker 621. In some example, the image framing apparatus 620 may include one or more image frame outlines 653, 655 and any of the image frame outlines may function as the marker.

The image framing apparatus 620 may be configured to be removably attached to the lens of eyewear, for example to lens 102 or eyewear 105 in FIG. 1. The image framing apparatus 620 may be implemented in the form of a removable decal. The image framing apparatus 620 may comprise a sheet 671 of flexible material configured to attach to a lens of the eyewear via static electrical force (also known as static cling). The sheet 671 may be made from vinyl or any other suitable flexible plastic material as is known in the art of cling materials. The sheet 671 may include an optically transparent portion, which defines the view finder window 622. The image framing apparatus 620 may include a peripheral portion 672. In some examples, the peripheral portion 672 may be made of opaque material and may be interchangeably referred to as a masking portion.

The view finder window 622 may include at least one image frame outline. In the example in FIG. 6, the view finder window 622 includes a first image frame outline 653 and a second image frame outline 655 that provide approximations of a landscape image and a portrait image, respectively, to be captured by a camera according to the examples herein. The image framing apparatus 620 may have a shape which is selected to fit within the shape of the lens of an eyewear (e.g., eyewear 105). The image framing apparatus 620 may be of any shape or size that is sufficient to accommodate the view finder window 622. In other words, the image framing apparatus 620 may be the size of or substantially the size of the view finder window 622 and may not include any peripheral portion. In some examples, the image framing apparatus 620 may be larger than the size of the view finder window, for example to provide additional plastic cling material for increased adhesion to the lens. The image framing apparatus 620 in the form of a decal may be affixed to and removed from the lens multiple times as may be desired for alignment and/or use of the image framing apparatus.

Figure 8:
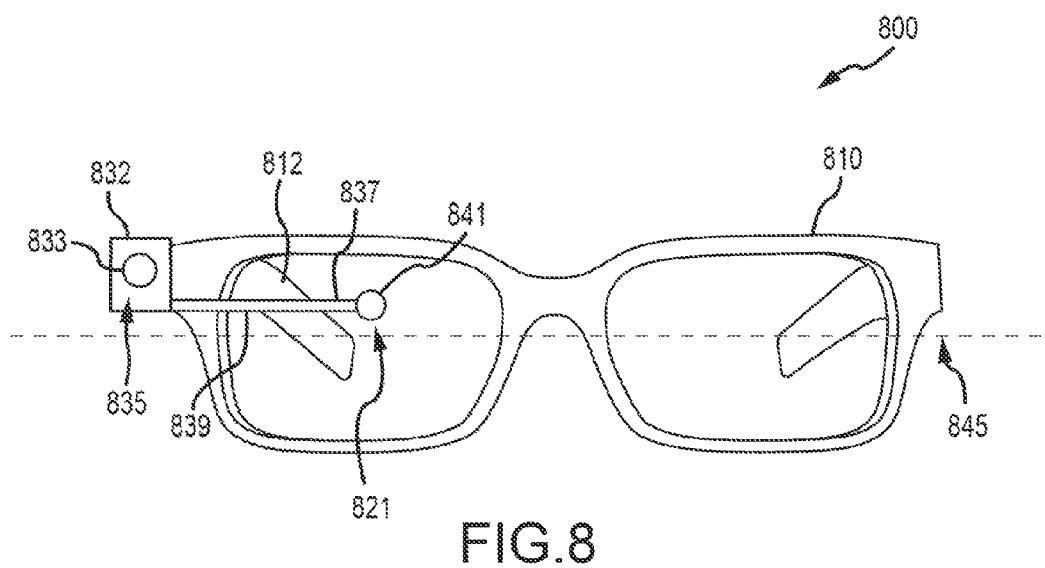
FIG. 8 is a front view of eyewear and eyewear camera attached thereto illustrating an alignment indicator in a deployed position according to examples herein.
Figure 9:
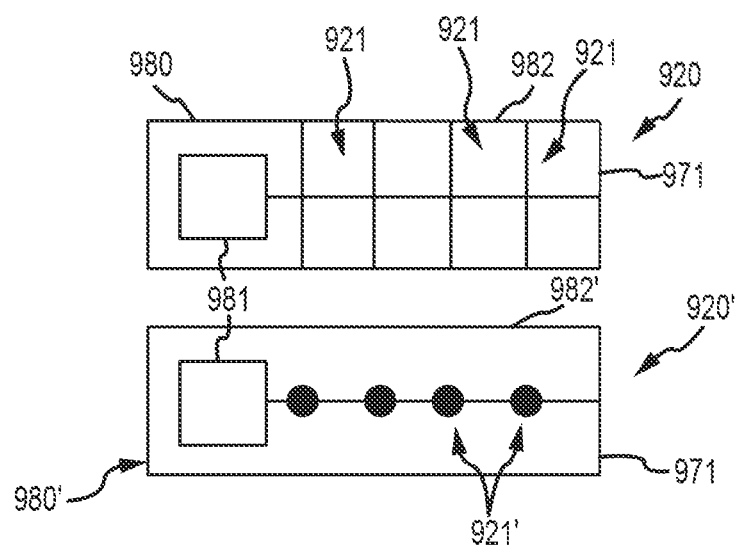
FIG. 9 is a view of an alignment indicator according to further examples of the present disclosure.

In some examples, the marker may be movably or removably attached to the camera. FIGS. 7-8 illustrate examples of apparatuses which include a marker movably attached to a camera according to the present disclosure. FIG. 9 illustrates examples of apparatuses which include a marker configured to be removably attached to a camera.

Figure 7A:
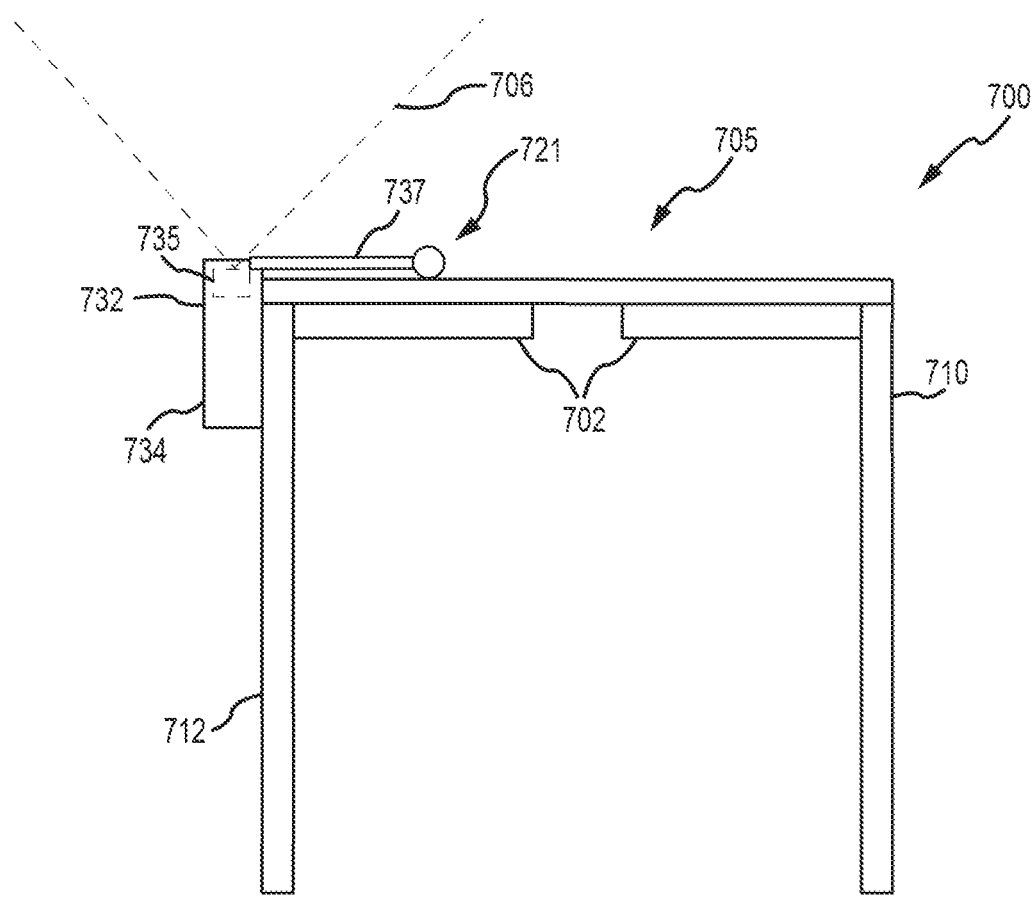
FIGS. 7A and 7B are bottom views of an eyewear camera attached to eyewear according to examples herein, the eyewear camera including an alignment indicator illustrated in a deployed and stowed position.
Figure 7B:
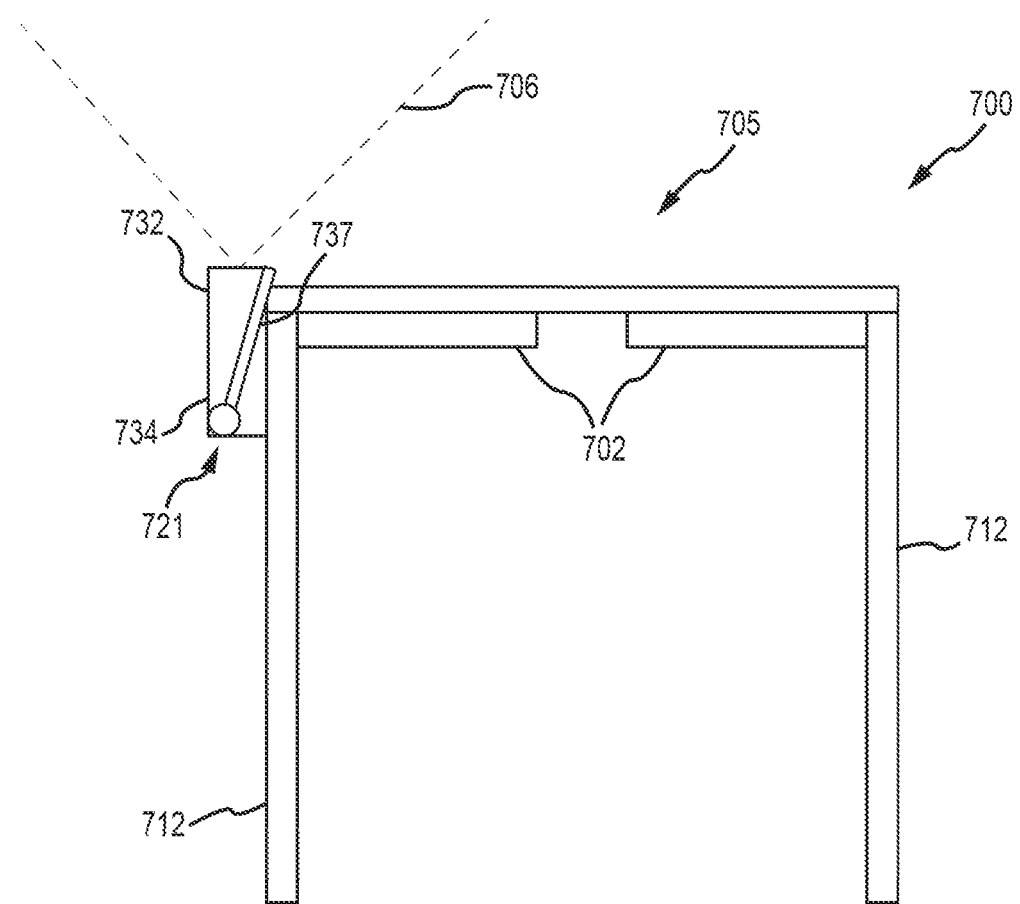

FIGS. 7A and 7B illustrate bottom views a wearable camera system 700 according to further examples of the present disclosure. The system 700 may include one or more of the components of wearable camera systems described herein, for example system 100, 200, or 500 described previously with reference to FIGS. 1, 2 and 5 respectively. Accordingly, similar components may be indicated with like number where the first numeral of the reference number corresponds to the figure number, for example eyewear 705 may be similar to eyewear 105 in FIG. 1 and include one or more of the components of functionality of eyewear 105, the description of which may not be repeated in the interest of brevity and conciseness of the disclosure.

The system 700 may include eyewear 705 and eyewear camera 732. The eyewear 705 may include an eyewear frame 710 which may include a pair of temples 712. The eyewear 705 may include a pair of lenses 702, which may be, without limitation, prescription lenses, non-prescription lenses, tinted lenses, changeable tint lenses, variable focus lenses, switchable focus lenses, or any combinations thereof.

The eyewear camera 732 may be movably coupled to the eyewear 705, for example slidably coupled to temple 712 of eyewear frame 710 using an attachment system described in U.S. patent application Ser. No. 14/816,995 entitled "WEARABLE CAMERA SYSTEMS AND APPARATUS AND METHOD FOR ATTACHING CAMERA SYSTEMS OR OTHER ELECTRONIC DEVICES TO WEARABLE ARTICLES, incorporated herein by reference in its entirety for any purpose. The camera 732 may be a miniaturized self-contained electronic camera system. The camera 732 may include one or more of the components and/or functionality of any of the cameras described herein or described in U.S. patent application Ser. No. 14/816,995. The eyewear camera 732 may include a camera body 734. The camera body 734 may include an optical system 735 and any internal electronics of the eyewear camera 732. In some examples, the optical system 735 may include a camera lens and/or an image capture device, such as a charge-coupled device (CCD) image sensor. The optical system 735 may be partially of fully enclosed within a housing of the camera 732. The eyewear camera 732 may have a field of view 706. A marker 721 may be coupled to the camera 732 such that the marker 721 may be positioned on or in front of the lens of the eyewear at a location such that when a wearer of the eyewear aligns the marker 721 with a target, the field of view 706 of the camera includes the target. The target may be an object or a scene that the wearer may wish to photograph.

In some examples, the eyewear camera 732 may include an alignment indicator 737, which may be configured to provide an indication of angular orientation of the camera 732 relative to a horizontal direction (e.g., direction 845 in FIG. 8). The alignment indicator 737 may be pivotably coupled to the camera body 734 such that the alignment indicator 737 may be moved between a first position (e.g., a deployed position as shown in FIG. 7A) and a second position (e.g., a stowed position as shown in FIG. 7B).

In the deployed position, the alignment indicator 737 or a portion thereof may extend into the field of view of an eye of a wearer of the system such that the wearer may perceive the alignment indicator or a portion thereof. For example, the wearer may perceive the marker 721 when the alignment indicator is in the deployed position. The alignment indicator 737 may be configured to pivot between the deployed position, in which the marker 721 is in the field of view of the wearer, to a stowed position, in which the marker 721 is adjacent to the camera. In the deployed position, the marker 721 may be positioned on or in front of the lens of the eyewear at a location such that when the wearer aligns the marker with a target, the field of view of the camera includes the target. The alignment indicator 737 may include an arm coupling the marker 721 to the camera 732. The marker 721, which may be located at an end of the arm, may provide a visual disturbance or visual interference within the field of view of the wearer such that the wearer may be able to determine if an object he or she wishes to photograph will be captured by the camera. In the stowed position, the alignment indicator 737 may be partially or substantially outside the field of view of the eye of the wearer.

Referring now also to FIG. 8, which illustrates a front view of a system 800 according to examples of the present disclosure, additional features of alignment indicators and cameras including alignment indicators according to the present disclosure are described. The system 800 may include some or all of the components of system 700 described previously with reference to FIG. 7 or any of the systems described herein. Accordingly, similar components may be indicated with like number where the first numeral of the reference number corresponds to the figure number. For example eyewear 805 may be similar to eyewear 705 in FIG. 7 and include one or more of the components of functionality of eyewear 705, the description of which may not be repeated in the interest of brevity and conciseness of the disclosure. The system 800 may include eyewear 805 including frame 810, the frame 810 including a temple 812.

The system 800 may include a camera 832 movably attached to temple 812. The camera 832 may include an optical system 835 which may include a camera lens 833 and may be configured for capturing an image. The camera 832 may include an alignment indicator 837 which may be movably coupled to camera 832. For example, the alignment indicator 837 may be pivotably coupled to the camera 832, for example a bottom portion of the camera. The alignment indicator 837 may be pivotable from a first position, for example a deployed position, to a second position, for example a stowed position. In some examples, the alignment indicator may include an arm 839 and a center indicator 841. It will be appreciated that term center is not meant to imply a precise center of an image to be captured; rather the center indicator may be used to visualize an approximate center of an image to be captured. The center indicator 841 may be located at one end of the arm 839 while the other end of the arm 839 may be pivotably coupled to the camera body. In some examples, the center indicator 841 may be provided at an intermediate location along the length of the arm 839. In some examples, e.g., depending on a size of the camera 832 and/or eyewear 805 to which the camera is attached, the arm 839 may be collapsible or extendible. For example, the arm 839 may be implemented as a telescoping arm which may extend in length for use and collapse in length for stowage, e.g., so that the alignment indicator 837 may fit completely within a footprint defined by a size of the camera. In some examples, the alignment indicator may be coupled to the camera such that when the alignment indicator is deployed, the arm portion is in-line with a horizontal axis of the camera. In this manner, the alignment indicator may provide an indication of the horizontal alignment of the camera by essentially providing a way to visualize whether the horizontal axis of the camera is aligned with the horizontal direction 845 when the camera is worn and fully or partially outside of the field of view of the wearer. If the arm, which may function as an extension of a horizontal axis of the camera into the field of view of the user, is angled relative to the horizontal direction 845, the user may adjust the angular orientation of the camera (e.g., by pivoting the camera or a portion thereof relative to the eyewear frame). In some example, the user may correct horizontal misalignment by tilting his or her head until the arm aligns with the horizontal direction 845.

In some examples, the alignment indicator may be separate from the camera and removably attachable thereto, e.g., as will be described with reference to FIG. 9. FIG. 9 illustrates embodiments of alignment indicators according to further examples of the present disclosure. The alignment indicators 920, 920' may be implemented in the form of a sheet 971 of flexible plastic material (e.g., static cling material) such that the alignment indicators 920, 920' may be removably attached to the camera (e.g., camera 132), the lens (e.g., lens 102), or both. The sheet 971 or portions thereof may be optically transparent. The sheet 971 may include one or more markers 921, 921'.

The sheet 971 may have a generally rectangular shape and may include a camera portion 980, 980' and an eyewear portion 982, 982'. In some examples, the sheet may be oval or generally oval in shape or may have an irregular shape as may be appropriate for a particular design of eyewear frame and resulting location of the camera attached thereto. For example, the sheet may have a curved shape such as a C shape or an S shape. The camera portion 980, 980' may be sized and/or shaped to fit over a front portion of the camera and attach to the front portion of the camera via static cling. The sheet 971 may include a camera aperture 981, which may be a physical aperture (e.g., a hole in the sheet 971) or a virtual aperture defined by a portion of optically transparent material. The camera aperture 981 may be located in the camera portion 980, 980' and may be sized to fit around or substantially around the camera lens such that an image may be captured with the camera while the sheet 971 remains affixed to the camera. The camera aperture 981 may have virtually any shape, such as rectangular, square, circular or oval shape, provided that the camera aperture 981 is sized and/or shaped so as to fall outside or substantially outside a field of view of the camera such that the camera aperture 981 does not substantially interfere with the capture of an image. In some examples, the camera aperture 981 may have a lateral dimension (e.g., a diameter or a width) which is substantially equal to or greater than a lateral dimension (e.g., a diameter) of the camera lens (e.g., camera lens 233 as in FIG. 2). The eyewear portion 982, 982' of the sheet may extend from the camera portion 980, 980' towards the user's field of view when the image framing apparatus is in use (e.g., attached to the wearable camera system).

The alignment indicator may include one or more markers 921, 921'. In some examples, a marker may be located in the eyewear portion 982, 982'. The eyewear portion may include a plurality of markers 921, 921'. The marker may have virtually any shape, for example a cross-hair, a bull's eye, an outline having virtually any shape such as a circle, triangle, square, or star, or any combinations thereof. Markers according to the present disclosure may facilitate alignment of the camera with a desired line of sight for capturing an image. For example, the marker may enable the user to determine whether a target (e.g., an object) would be included in a captured image and align the field of view of the camera to include the target in the captured image. In some examples, a plurality of markers may be provided for use with different settings of the camera. For example, a camera may have zoom capability and a different marker may correspond with an approximation of a center of the field of view of the camera at each of the zoom settings of the camera. In some examples, the alignment indicator may also provide the functionality of framing an image. For example, the sheet may additionally include one or more image frame outlines as described herein which may enable the user to visualize an approximation of the image to be captured. It will be further appreciated that any of the examples herein may be used in any combination with one another.

A method for capturing a digital image according to the present disclosure may include some or all of the following steps. The user may position a marker on or in front of a lens of eyewear, a camera being coupled to the eyewear. The user may aligning the marker with a target, for example an object the user wishes to capture, and the user may then capturing an image with the camera while maintaining the target in alignment with the marker such that the target is included in the image. In some example, positioning the marker may include attaching a sheet of static cling material to the lens, the sheet including the marker. The sheet may be sheet 671 or sheet 971 some or portions of which may be made from an optically transparent static cling material. The method may include repositioning the sheet by removing the sheet from the lens and reaffixing the sheet to a new location on the lens.

In some examples, the marker may be provided on a sheet of static cling material which includes a camera aperture and the positioning of the marker may include aligning the camera aperture of the sheet with the lens of the camera prior to attaching the sheet to the front portion of the camera. In some examples, the marker may be attached to an arm pivotably coupled to the camera, and the positioning of the marker may include rotating an arm from a first position (e.g., a stowed position) to a second position (e.g., a deployed position). In some examples, the camera may be movably coupled to the eyewear, for example pivotably coupled to the eyewear. The user may capture an image in a first orientation, for example a landscape orientation. The user may rotate the camera from the first orientation to a second orientation for capturing an image in the second orientation, for example a portrait orientation. In some examples, the method may include aligning a horizontal direction of the camera by rotating the camera or a front portion of the camera relative to the eyewear to align an alignment indicator with a horizontal direction (e.g., the ground).

Although the present disclosure includes, by way of example, illustration and description of some embodiments, it will be understood by those skilled in the art that several modifications to the described embodiments, as well as other embodiments are possible without departing from the spirit and scope of the present invention. It will be appreciated that any of the components, features, or aspects from any of the disclosed embodiments may be used in combination with one another, without limitation, and without departing from the scope of the present disclosure.

What is claimed is:

1. A wearable camera system comprising:
an eyewear including a temple and a lens;
a camera coupled to the eyewear and having a field of view;
a marker coupled to the eyewear, the camera, or both, and positioned on or in front of the lens of the eyewear at a location such that when a wearer of the eyewear aligns the marker with a target, the field of view of the camera includes the target; and
an alignment indicator comprising the marker, wherein the alignment indicator is pivotably coupled to the camera, and wherein the alignment indicator comprises an arm coupling the marker to the camera and configured to pivot between a deployed position in which the marker is positioned in the location to a stowed position in which the marker is adjacent to the camera.

2. The wearable camera system of claim 1, wherein the arm is aligned with a horizontal orientation of the image capture device when the arm is in the deployed position.

3. The wearable camera system of claim 1, wherein the marker comprises a center indicator configured to provide an indication of an approximate center of the field of view of the camera.

4. The wearable camera system of claim 1, wherein the camera is movably coupled to the temple.

5. The wearable camera system of claim 1, wherein the marker comprises a center indicator configured to provide an indication of an approximate center of the field of view of the camera.

6. A wearable camera system comprising:
an eyewear including a temple and a lens;
a camera coupled to the eyewear and having a field of view;
a marker coupled to the eyewear, the camera, or both, and positioned on or in front of the lens of the eyewear at a location such that when a wearer of the eyewear aligns the marker with a target, the field of view of the camera includes the target; and
an image framing apparatus removably coupled to the eyewear and comprising the marker, wherein the image framing apparatus includes a first image frame outline, wherein the marker is within the first image frame outline, and wherein the camera is pivotably between a first orientation and a second orientation, and wherein the camera is pivotably between a first orientation and a second orientation, and wherein the first image frame outline is configured to provide an approximation of an image to be captured by the camera when the camera is in the first orientation, and the image framing apparatus further comprising a second image frame outline configured to provide an approximation of an image to be captured by the camera when the camera is in the second orientation.

7. The wearable camera system of claim 6, wherein the image framing apparatus includes a second image frame outline enclosed by the first image frame outline.

8. The wearable camera system of claim 6, wherein the camera is movably coupled to the temple.

9. A method for capturing a digital image, the method comprising:
positioning a marker on or in front of a lens of eyewear, a camera coupled to the eyewear, wherein the marker is attached to an arm pivotably coupled to the camera, and wherein said positioning a marker comprises rotating an arm from a first position to a second position;
aligning the marker with a target; and
capturing an image with the camera while maintaining the target in alignment with the marker to include the target in the image.

10. The method of claim 9, wherein said capturing an image includes capturing a first image in a landscape orientation, the method further comprising rotating the camera about a pivot joint to capture a second image in a portrait orientation.

11. The method of claim 9, wherein the camera is movably coupled to the eyewear, the method further comprising rotating the camera or a front portion of the camera relative to the eyewear to align the arm with a horizontal direction.

12. A method for capturing a digital image, the method comprising:
positioning a marker on or in front of a lens of eyewear, a camera coupled to the eyewear;
aligning the marker with a target; and
capturing an image with the camera while maintaining the target in alignment with the marker to include the target in the image, wherein said capturing an image includes capturing a first image in a landscape orientation, the method further comprising rotating the camera about a pivot joint to capture a second image in a portrait orientation.

13. The method of claim 12, wherein said positioning a marker comprises attaching a sheet of static cling material to the lens, the sheet including the marker.

14. The method of claim 12, wherein the marker is provided on a sheet of static cling material comprising a camera aperture, and wherein said positioning a marker comprises aligning the camera aperture of the sheet with the lens of the camera and attaching the sheet to a front portion of the camera.

15. The method of claim 12, wherein the marker is attached to an arm pivotably coupled to the camera, and wherein said positioning a marker comprises rotating an arm from a first position to a second position.

16. The method of claim 15, wherein the camera is movably coupled to the eyewear, the method further comprising rotating the camera or a front portion of the camera relative to the eyewear to align the arm with a horizontal direction.

* * * * *